United States Patent [19]

Victor

[11] Patent Number: 4,712,752
[45] Date of Patent: Dec. 15, 1987

[54] WING TRAILING EDGE AIR DAM

[75] Inventor: Paul F. Victor, Redmond, Wash.

[73] Assignee: The Boeing Company, Seattle, Wash.

[21] Appl. No.: 777,827

[22] Filed: Sep. 19, 1985

Related U.S. Application Data

[62] Division of Ser. No. 474,654, Dec. 6, 1982, Pat. No. 4,618,109.

[51] Int. Cl.$^4$ .............................................. B64C 3/26
[52] U.S. Cl. ................................. 244/129.1; 244/123; 244/215; 244/130
[58] Field of Search ............... 244/211, 212, 213, 215, 244/123, 124, 129.4, 130, 90 B, 129.1, 52

[56] References Cited

U.S. PATENT DOCUMENTS

| | | |
|---|---|---|
| 2,158,676 | 5/1939 | Engelhardt . |
| 2,368,205 | 1/1945 | Diehl . |
| 2,403,770 | 7/1946 | Van Zelm . |
| 2,405,208 | 8/1946 | Harris . |
| 2,406,920 | 9/1946 | Stalker . |
| 2,444,293 | 6/1948 | Holt . |
| 2,461,745 | 2/1949 | Lang . |
| 2,549,760 | 4/1951 | Adams . |
| 2,791,387 | 5/1957 | Weinberg . |
| 3,026,067 | 3/1962 | Grant . |
| 3,309,042 | 3/1967 | Edwards . |
| 3,628,756 | 12/1971 | Johnson . |
| 3,790,106 | 2/1974 | Sweeney et al. . |
| 3,934,846 | 1/1976 | Maurer . |
| 4,007,896 | 2/1977 | Reynolds, III . |
| 4,131,252 | 12/1978 | Dean et al. . |
| 4,283,029 | 8/1981 | Rudolph . |
| 4,447,028 | 5/1984 | Wang . |

Primary Examiner—Jeffery V. Nase
Assistant Examiner—Rodney Corl
Attorney, Agent, or Firm—Christensen, O'Connor, Johnson & Kindness

[57] ABSTRACT

An air dam (102) is positioned between an opening (101) existing between the wing rear spar cavity (34) and a flap track fairing (18c) that depends downwardly from wing (10) to block the flow of air between the fairing and the rear spar cavity, thereby also reducing the drag on the wing.

10 Claims, 5 Drawing Figures

WING TRAILING EDGE AIR DAM

CROSS-REFERENCE TO RELATED APPLICATION

This is a voluntary divisional to U.S. application Ser. No. 474,654 filed Dec. 6, 1982, now U.S. Pat. No. 4,618,109.

TECHNICAL FIELD

The present invention relates to devices for reducing airflow through the interior of an airplane, and more particularly, to air dams installed within the trailing edge portion of airplane wings to separate the wings into independent internal cavities to lower drag on the airplane by reducing the disruption to the air flowing over the wings due to air entering, flowing through and then exiting from the wings.

BACKGROUND OF THE INVENTION

The entrance of air into and the passage of air through the interior of an aircraft during flight is known to have an adverse affect on performance. The flow of air into the interior cavities of an aircraft creates a loss in the momentum of the local airflow over the wing and consequently increases drag. Openings in the air craft may stem from an imperfect seal between various components, such as between the fuselage and the landing cavity doors, between the forward edge of the fixed wing and forward slats or between the rearward edge portion of the fixed wing and various flaps or spoilers. Openings that lie in higher pressure regions of the aircraft act as air inlets while the openings in lower pressure regions act as air outlets.

In the past, attempts have been made to reduce internal airflow by using seals to minimize the size of openings in the aircraft. Resilient, bulb-type seals have been placed around the inside perimeter of forward slats to press against the forward edge portion of the fixed wing to decrease the airflow through the coves existing between the slats and the fixed wing. Bulb seals also have been placed between the abutting end portions of adjacent wing flaps to block the passage of air therebetween. In addition, seals have been positioned around the perimeter of ailerons to prevent air leakage into the aileron cavity and the adjacent portions of the wing. While these seals may help to control the volume of air entering the interior of an aircraft, they are not entirely effective, in part due to deflections in the flaps and other components during flight and due to changes in the resiliency of the seal material with variations in ambient conditions. Moreover, these seals do not address the problem of blocking airflow once the air has actually gained entrance into the aircraft by flowing past the seals or through drain holes formed in various portions of the wing to expel moisture that has accumulated therein.

Also, in the past, large components or cavities of an aircraft have been sealed from each other. For instance, the cavity that houses aircraft landing gear has been divided from adjacent portions of the fuselage and the inboard end of the wing by use of rather large partitions that could substantially increase the weight of the aircraft. It can be appreciated that indiscriminate use of such partitions may negatively affect performance by increasing the weight of the aircraft beyond the efficiencies achieved by reduction in drag. Moreover, the partitions placed between the component sections of the aircraft do not adequately address the problem of reducing internal airflow through various portions of individual cavities themselves, such as through the rear spar cavity of a wing.

Accordingly, it is a principal object of the present invention to decrease the drag on an aircraft by blocking the flow of air through the interior of the aircraft wing, and especially through the rear spar cavity of the wing.

It is a particular object of this invention to strategically locate air dams within an aircraft wing to achieve a high level of drag reduction relative to the increase in the weight of the aircraft from the presence of air dams.

It is another particular object of this invention to incorporate the air dams into structural, load-bearing components of the wing.

SUMMARY OF THE INVENTION

The foregoing and other objects are achieved in accordance with the present invention by placing air dams within an aircraft wing to close off higher pressure regions of the wing from lower pressure regions. This reduces the quantity of air from entering into the wing in the higher pressure regions and exiting out through openings at the lower pressure regions, thereby achieving a reduction in the volume of air flowing through the wing. In each embodiment of this invention an air dam is positioned to limit the flow of air through the rear spar cavity of a wing. In typical wing construction, the forward boundary of the rear spar cavity is formed by the rear spar member extending spanwise along the length of the wing. The rear boundary of the spar cavity is defined by rear flaps and/or spoilers spaced rearwardly from the rear spar and by ailerons also spaced rearwardly from the rear spar. The upper and lower boundaries of the spar cavity are defined by the upper and lower wing surfaces extending rearwardly from the rear spar to tangentially meet the rear flaps and/or spoilers.

In one embodiment of the present invention, a first air dam is disposed generally along an upright, chordwise plane to extend rearwardly from the rear spar and transversely across the rear spar cavity to abut against a rear flap and/or spoiler. The dam in basic form is composed of a rigid wall structure, which is securely attached to the rear spar not only to block the air flowing spanwise through the rear spar cavity, but also to reinforce the wing structure. To achieve a lightweight, but high-strength construction, the first air dam comprises a thin panel portion that is reinforced by stiffener flanges extending transversely outwardly therefrom. The flanges extending along the rearward portion of the panel carry resilient seals that press against the adjacent portions of the rear flap and/or spoiler to form an air-blocking seal therebetween.

In a further embodiment of the present invention, additional air dams prevent air from flowing between the flap track fairings and the rear spar cavity. The flap track fairings are shaped in the form of elongated, upwardly open trough-like members that depend downwardly from the wing to house the linkage assembly used to operate the rear flaps. Openings exist between the rear spar cavity and flap track fairings to provide clearance for the drive mechanisms used to power the linkage assemblies. The additional dams close off the openings existing between the flap track fairings and the rear spar cavity. The additional dams in basic construction each include a plate member cantilevered rearwardly from the rear spar to terminate adjacent the nose of the rear flap. A seal is mounted along the rear boundary of the plate member to form an air-blocking seal between the plate member and the nose of the rear flap.

BRIEF DESCRIPTION OF THE DRAWINGS

The details of typical embodiments of the present invention will be described in connection with the accompanying drawings, in which.

DETAILED DESCRIPTION

Figure 1:
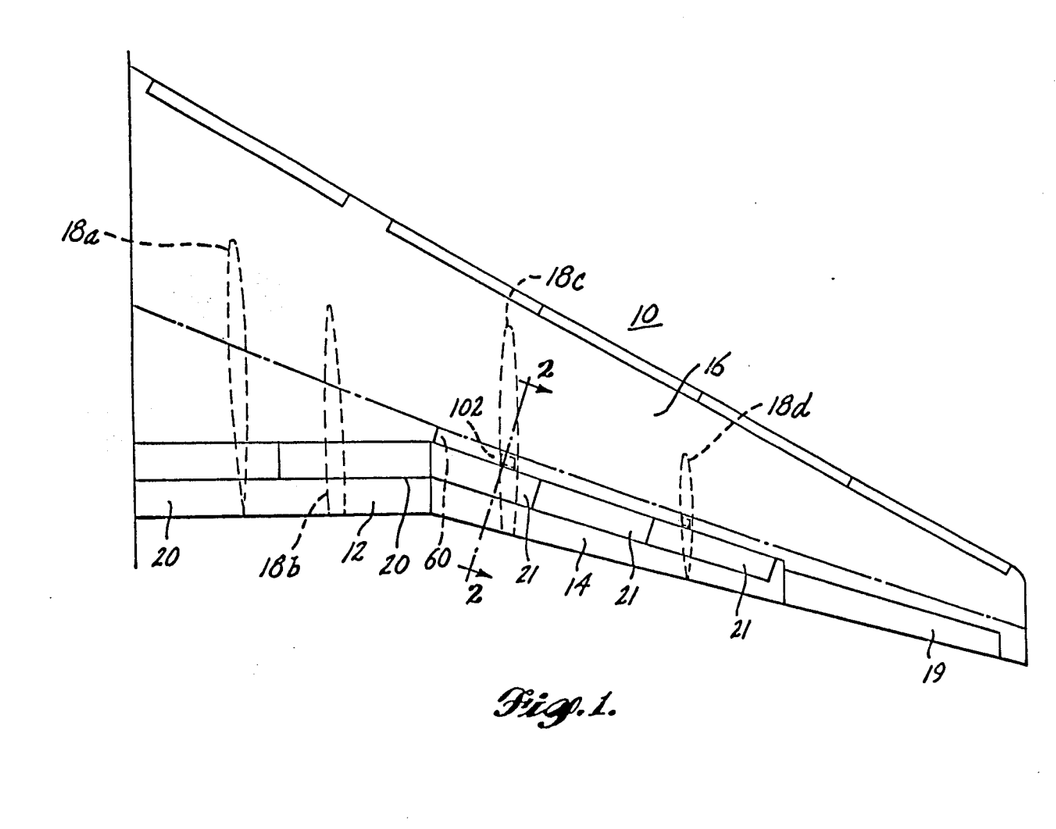
FIG. 1 is a schematic, plan view of an airplane wing advantageously utilizing the present invention.
Figure 2:
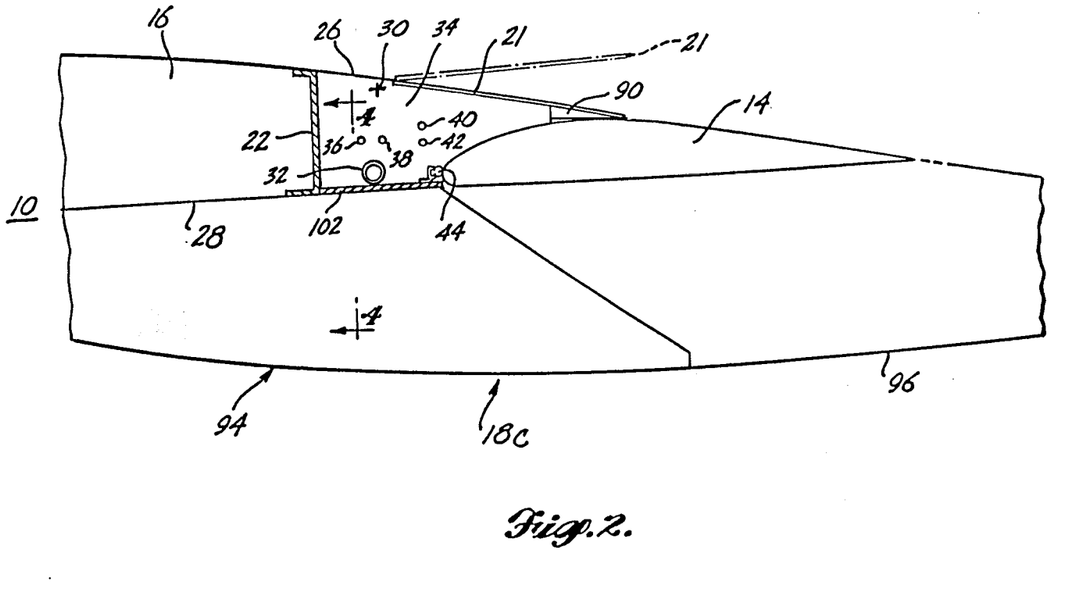
FIG. 2 is an enlarged, schematic, partial cross-sectional view of the airplane wing shown in FIG. 1, taken substantially along lines 2—2 thereof.

FIGS. 1 and 2 schematically illustrate a typical airplane wing 10 that advantageously employs the present invention. In basic construction, the wing includes inboard and outboard flaps 12 and 14, respectively, extending spanwise along the trailing edge of a fixed-wing structure 16. Linkage mechanisms, not shown, used to operate flaps 12 and 14, are housed in flap track fairings 18a, 18b, 18c and 18d, which depend below wing 10. A plurality of spoilers 20 and 21 overlie forward portions of flaps 12 and 14. The wing also includes an aileron 19 outboard of flap 14.

Figure 3:
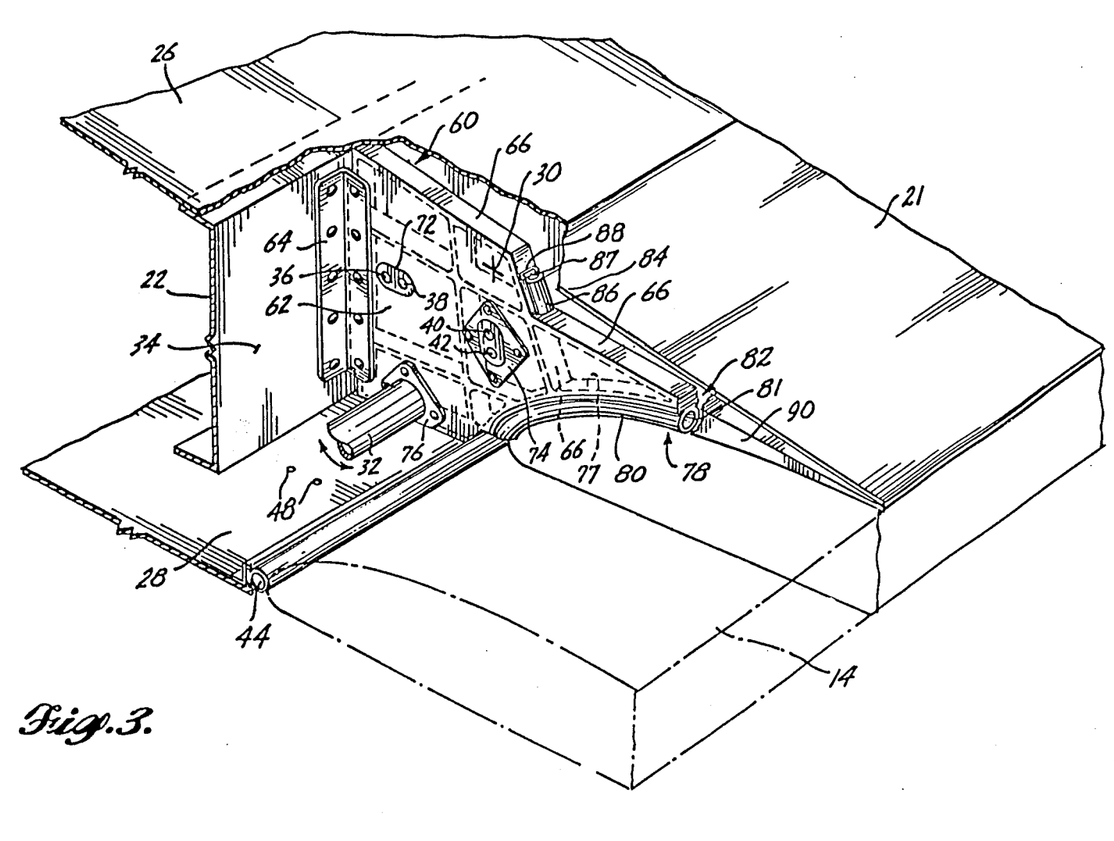
FIG. 3 is an enlarged, fragmentary, isometric view of a rearward portion of the wing shown in FIG. 1, specifically illustrating one typical embodiment of the present invention.

Additionally referring to FIG. 3, fixed-wing structure 16 is formed with a rear spar 22 that extends spanwise from the fuselage along the rear portion of the wing structure to serve as a primary structural component of the wing structure. An upper surface or skin 26 extends rearwardly over the upper edge of rear spar 22 to intersect tangentially with the front portion of spoilers 20 and 21 when in retracted position, as shown in FIGS. 2 and 3. Likewise, a lower surface or skin 28 extends rearwardly under the lower edge of the rear spar to interset with the nose of retracted flaps 12 and 14. Spoilers 21 are pivotable about axis 30 between a retracted position coextensive with upper surface 26, as shown in solid line in FIGS. 2 and 3, and an actuated position extending upwardly from the upper surface 26, as shown in phantom line in FIG. 2 through the use of an appropriate actuating mechanism, not shown, as is well known in the art. Spoilers 20 are movable in a similar manner. As is typical in airplane operation, spoilers 21 are disposed in retracted position during normal flight conditions and are shifted to an actuated position during lateral turning and landing when increased drag is required.

As illustrated in FIGS. 2 and 3, outboard flaps 14 are spaced rearwardly from rear spar 22, with the lower surface of the flap coextensive with wing lower surface 28 when the flap is disposed in retracted position during normal flight conditions to minimize drag. When increased lift is required, flap 14 is movable rearwardly relative to spar 22 and then the trailing edge of the flap is tiltable downwardly by a linkage arrangement, not shown, housed within flap track fairings 18c and 18d. This linkage arrangement is powered by a torque tube 32 extending spanwise through wing 10 at a location slightly rearward of rear spar 22.

As most clearly shown in FIGS. 2 and 3, in a manner typical in airplane wing construction, the rear spar 22, upper and lower surfaces 26 and 28, spoilers 21 and flaps 12 and 14 cooperatively define a rear spar cavity 34 extending spanwise through wing 10. At the outward portion of wing 10, beyond the flaps 12 and 14, the rear spar cavity is defined by the rear spar 22, upper and lower surfaces 26 and 28 and aileron 19. The rear spar cavity forms a convenient passageway for various electrical lines 36 and 38 and hydraulic tubes 40 and 42 in addition to housing torque tube 32, which powers the rear flaps, as discussed above. A bulb-type seal member 44 is mounted spanwise along the rearward edge of lower wing surface 28 to press against the nose of retracted rear flap 14 to limit the passage of air between the rear flap and the lower fixed wing surface. Seal 44 is employed to minimize, or at least reduce, the flow of air into and out of rear spar cavity 34 since it is known that the flow of external air into this cavity creates a loss in the momentum of the local airflow, which consequently results in an increase in drag. Also, the leakage of air out of the rear spar cavity produces a corresponding intake of air at another location in wing 10, which in turn results in an associated loss in momentum of the local airflow and thus an increase in drag. In spite of this attempt to prevent air from entering into and exiting out of rear spar cavity 34, a certain quantity of air leaks past seal 44, especially when spoilers 20 and flaps 12 and 14 deflect under high loading during flight conditions. Air also enters into and exits from the rear spar cavity from other sources, such as through drain holes 48 (FIG. 3) formed in lower surface 28 to drain moisture that has accumulated within the spar cavity.

Applicant has found that in typical airplane wing designs, the pressure of the air flowing over the wing near these openings varies along the wingspan. Since the openings that are located in higher pressure regions of the rear spar cavity 34 act as air inlets, while the openings located in the lower pressure regions of the cavity act as outlets, the air flowing through wing openings, such as through drain holes 48 and past seal 44, typically flows spanwise through the wing rear spar cavity 34 from a relatively high-pressure location to a relatively low-pressure location.

To reduce or minimize the spanwise flow of air through rear spar cavity 34, applicant, in accordance with the present invention, has provided a rear spar air dam 60. Dam 60 is shown in FIG. 3 as being constructed from a thin, upright panel 62, which extends chordwise across the rear spar cavity 34 at a location adjacent the intersection of inboard flap 12 and outboard flap 14. Panel 62 is shaped to correspond to the cross-sectional profile of spar cavity 34 at this spanwise location. Preferably, the forward, vertical edge of panel 62 is attached to rear spar 22 through the intermediacy of an angle-shaped bracket 64 that is suitably secured to the panel and spar by rivets, weldments, or other appropriate means. Also, in a preferred form of the present invention, flanges 66 extend transversely outwardly from panel 62 to stiffen the panel sufficiently to enable it to serve as a structural member for reinforcing the adjacent portion of wing 10. Flanges 66 extend along the outer perimeter of panel 62 and also generally horizontally and vertically across the panel to divide the panel into a plurality of segments or areas. Ideally, the portions of flange 66 extending along the bottom edge of panel 62 are secured to the lower wing surface 28 by appropriate fastener means, not shown, such as by rivets or weldments.

Oblong openings are formed in dam 60 to provide clearance for lines 36, 38, and tubes 40 and 42. Preferably, flanged grommet assemblies 72 and 74 snugly encircle lines 36 and 38 and tubes 40 and 42, respectively, and extend over corresponding openings in dam 60 to form an airtight seal between the lines and their openings and between the tubes and their openings. The flange portions of grommet assemblies 72 and 74 may be secured to dam 60 by appropriate fastening means, such as through the use of rivets. A flanged seal 76 also closely engages over torque tube 32, which extends through an opening formed in the lower portion of dam 60, to form a relatively airtight seal between the torque tube and the panel opening while still allowing free rotation of the torque tube.

The rearward edge portion 77 of dam 60 is contoured to match the profile of flap 14. This portion of the dam is sealed relative to the ajacent portion of rear flap 14 by an elongated seal assembly 78 composed in part of a bulb-type seal member 80. Seal member 80 includes a flange portion 81 that is engaged within a retaining track 82, that is in turn secured to the portion of flange 66 extending along dam edge portion 77. In a like manner, the boundary between spoiler 21 and air dam 60 is sealed by a seal assembly 84 composed of a bulb-type seal member 86 that presses against the spoiler when it is in retracted position. Seal member 86 includes a flange portion 87 engaged within a retaining track 88 that in turn is mounted on the portion of flange 66 extending along the boundary between the spoiler and air dam 60. Also, elongated triangularly shaped moulded seal 90 is positioned to extend rearwardly of elongated seal 80 to bear against the underside of spoiler 21 and the upper surface of flap 14 when the spoilers and flap are in retracted positions, i.e., during normal cruise conditions. Seal 90 may be secured to the underside of spoiler 21 by any suitable means, such as rivets or an adhesive.

It will be appreciated that by the above-described construction, rear spar air dam 60 is formed in a lightweight, but high-strength manner having sufficient structural integrity to stiffen the adjacent region of wing 10. In addition, seal assemblies 78 and 84 minimize any air leakage between air dam 60 and either flap 14 or spoiler 20. As a consequence, air dam 60 functions to efficiently block the spanwise flow of air through rear spar cavity 34 without adding an appreciable amount of weight to wing 10. Applicant has discovered that by the use of rear spar air dams, such as air dam 60, a relatively large reduction in drag on wing 10 in terms of drag equivalent weight savings is achieved with only a relatively small increase in weight of the wing.

Although the construction and use of one specific air dam has been described with particularity, i.e., dam 60, it is to be recognized that if deemed desirable, additional similarly constructed air dams also may be employed. The use of the additional air dams will, of course, be dependent upon their effectiveness in reducing drag relative to the increase weight added to wing 10.

Next, referring to FIGS. 1, 2, 4 and 5, as noted above, wing 10 also includes flap track fairings 18a, 18b, 18c and 18d that house the linkage mechanisms not shown for operating flaps 12 and 14. The fairings are generally shaped in the form of an elongated, upwardly open trough with the side edge portions of the fairings intersecting with the wing lower surface 28 to form an enclosed, downwardly depending structure. For reduction of drag, the fairings are typically longitudinally aligned with the local airflow, and thus are skewed relative to the span of wing 10.

Figure 4:
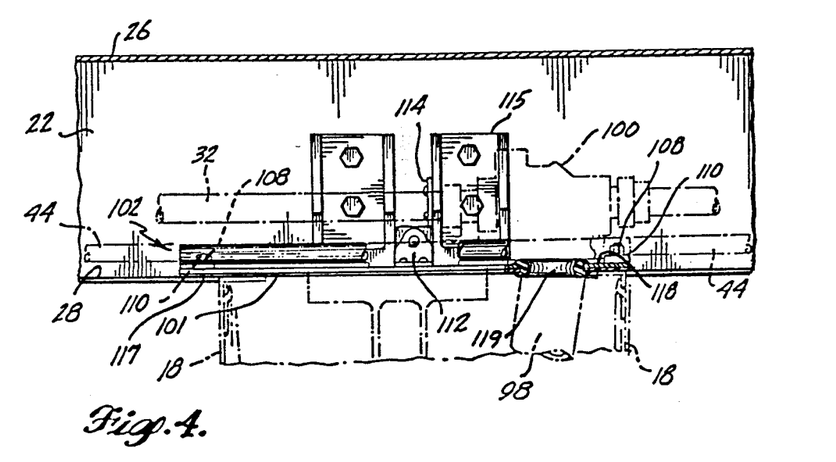
FIG. 4 is an enlarged, fragmentary cross-sectional view of a portion of the wing illustrated in FIG. 2 taken substantially along lines 4—4 thereof and specifically illustrating another typical embodiment of the present invention.
Figure 5:
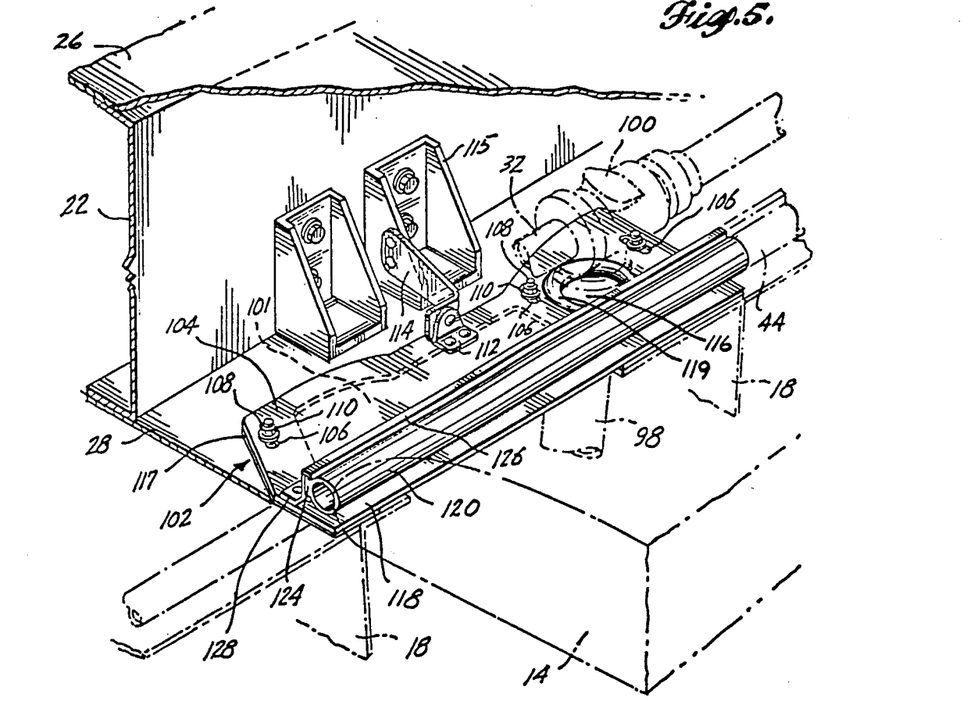
FIG. 5 is an enlarged, fragmentary isometric view of the portion of the portion of the wing illustrated in FIG. 4 as viewed from above and the left side of FIG. 4.

Since fairings 18a, 18b, 18c and 18d are similarly constructed, only fairing 18c will be described with particularity, with the understanding that this description also applies to the remainder of the fairings. As shown in FIG. 2, the fairing 18c includes a forward, stationary section 94 fixedly secured to the underside of fixed wing structure 16 and a rearward, movable section 96 that shifts relative to the forward section 94 with the movement of flap 14. As noted above, the linkage mechanism, not shown, for operating flap 14 is housed within the flap track fairings. This linkage is operated by an upright torque tube 98, which in turn is powered by the horizontal torque tube 32 extending spanwise through rear spar cavity 34, as noted above. As best shown in FIGS. 4 and 5, a differential 100 interconnects the upper end of torque tube 98 in torque-transmitting relationship with an intermediate portion of torque tube 32.

A significant portion of the lower wing surface 28 is removed at the intersection of rear spar cavity 34 and the flap track fairing 18c to provide a clearance opening 101 for differential 100 and upright torque tube 98. Applicant has found that the air pressure within fairing 18c is typicaly higher than the air pressure within rear spar cavity 34. As a result, air entering fairings 18c, for instance, at the juncture of stationary fairing section 94 with movable section 96, flows upwardly into the rear spar cavity 34, thereby contributing to the drag on the aircraft.

In accordance with the present invention, to block the flow of air between flap track fairing 18c and rear spar cavity 34, an air dam 102 is disposed within the opening 101 existing between these two portions of wing 10. In a preferred form of the present invention, air dam 102 includes a flat plate member 104 that is formed generally in the shape of opening 101 and of a length somewhat longer than the opening to enable the ends of the plate member to overlie the adjacent portions of lower wing surface 28. As best illustrated in FIG. 5, oblong slots 106 are formed in the end portions of plate member 104 for reception of studs 108 extending upwardly from lower wing surface 28 to engage with asssociate fasteners, such as nuts 110. An angle member 112 is attached to a central, forward edge portion of plate member 104 both to stiffen the plate member and interconnect it to an angle bracket 114 extending rearwardly from a rear spar reinforcing bracket 115.

A circular clearance opening 116 is formed in the outboard end portion of plate member 104 to provide clearance between the plate member and the differential 100. Preferably, a grommet 119 or other seal means is interposed between the differential and the plate opening to form an air-blocking seal therebetween. In addition, ideally, a flat rubber strip or similar seal 117 is adhered or otherwise fixedly attached to the underside of plate member 104 to extend forwardly to overlap the forward edge of opening 101 thereby forming an air-blocking seal between the opening and the plate member. Air dam 102 also preferably includes a rear seal assembly 118 to prevent the passage of air between the rear edge portion of plate member 104 and the nose of flap 14 when in retracted position. Rear seal assembly 118 is in alignment with the adjacent sections of seal 44. The rear seal assembly is constructed with a hollow, bulb-type seal member 120 that bears against the nose of flap 114 and a flat flange member 124 tightly inserted within a generally C-shaped, vertically edgewise disposed retaining track 126, which in turn is secured to lower wing surface 28 by a generally flat, horizontal flange 128.

It will be appreciated that by the above-described construction, air dam 102 substantially eliminates the passage of air between flap track fairing 18c and rear spar cavity 34, which results in a corresponding decrease in drag on wing 10. Moreover, the lightweight construction of air dam 102 does not add an appreciable amount of weight to wing 10.

Although an air dam 102 has been described in conjunction with a particular flap track fairing, i.e., fairing 18c, it is to be undersood that similar air dams may be employed in conjunction with the remainder of the fairings. Whether such additional air dams are actually used, of course, depends to a large extent on the volume of air flowing between the fairings and the rear spar cavity 34. This in turn is influenced by the spanwise location of the fairing since, as discussed above, applicant has discovered that air pressure within the rear spar cavity varies along the span of the wing. As will be appreciated, the amount of air passing between the flap track fairings and the rear spar cavity also is affected by the use of air dams that divide the rear spar cavity into separate segments, such as dam 60 described above.

Applicant has investigated the possibility of placing air dams, constructed similarly to dams 60 and 102, in other locations within wing 10 but has discovered that the greatest reduction of drag relative to the weight added to the wing is achieved by these two dams. Applicant is not aware of comprehensive past efforts made to use air dams to reduce the volume of airflow through the rear spar cavity of an airplane wing. The absence of such effort may have been due to the failure to appreciate the significant volume of air that actually passes through the rear spar cavity or perhaps due to the lack of an analytical method of analyzing or safe procedure of flight testing the effectiveness of such air dams. Nevertheless, by the present invention, a significant increase in the efficiency of the airplane during flight has been gained.

As will be apparent to those skilled in the art to which the invention is adresesd, the present invention may be embodied in forms other than those specifically disclosed above without departing from the spirit or essential characteristics of the invention. The particular embodiments of air dams 60 and 102, described above, are therefore to be considered in all respects as illustrative and not restrictive. The scope of the present invention is as set forth in the appended claims rather than being limited to the examples of the air dams 60 and 102 set forth in the foregoing description.

The embodiments of the invention in which an exclusive property or privilege is claimed are defined as follows:

1. In an aircraft wing having a fixed wing structure, a rear flap extending rearwardly from the fixed wing structure to define a spanwise wing rear cavity, a flap track fairing depending downwardly from the fixed wing structure including from the spanwise rear cavity portion thereof, with the flap track fairing being nominally open at intersection with the wing rear cavity, actuating means disposed in the flap track fairing for actuating the rear flap, an air dam assembly comprising:

removable air dam means which are structurally independent from the wing structure and configured to correspond to the shape of the opening at intersection of the wing rear cavity and the flap track fairing; and, mounting means for detachably securing said air dam means to the wing in a position over the opening at the intersection of the wing rear cavity and the flap track fairing to prevent passage of air therebetween thereby to reduce the drag on the aircarft wing from atmospheric airflow into the aircraft while enabling removal of said air dam means from the flap track fairing opening to facilitate the initial construction of the aircraft including the assembly of the actuating means for the rear flap within the flap track fairing and to facilitate inspection of the actuating means for the rear flap.

2. The air dam assembly according to claim 1, wherein the fixed wing structure includes a rear spar extending spanwise along the forward boundary of the wing rear cavity; and, said mounting means detachably secures said air dam means to the rear spar to extend rearwardly therefrom toward the rear flap.

3. The air dam assembly according to claim 1, further comprising a reinforcing member affixed to said air dam means for stiffening said air dam means, said reinforcing member also configured to function as said mounting means for detachably securing said air dam means to the wing.

4. In an aircraft wing having a fixed wing structure, a rear flap extending rearwardly from the fixed wing structure to define a spanwise wing rear cavity, a flap track fairing depending downwardly from the fixed wing structure including from the spanwise rear cavity portion thereof, with the flap track fairing being open at intersection with the wing rear cavity, actuating means disposed in the flap fairing for actuating the rear flap, air dam means comprising:

a removable air dam which is structurally independent from the wing and positionable over the opening at intersection of the wing rear cavity and the flap track fairing to prevent passage of air therebetween;

mounting means for detachably securing said air dam to the wing; and, wherein said air dam includes marginal portions extending around the periphery of the air dam for overlapping the margins of the opening between the rear wing cavity and the flap track fairing.

5. The air dam means according to claim 4, wherein said marginal portions include sealing means for forming an air blocking seal between the air dam and the opening at the intersection of the rear wing cavity and the flap track fairing.

6. In an aircraft wing having a fixed wing structure, a rear flap extending rearwardly from the fixed wing structure to define a spanwise wing rear cavity, a flap track fairing depending downwardly from the fixed wing structure including from the spanwise rear cavity portion thereof, with the flap track fairing being open at intersection with the wing rear cavity, actuating means disposed in the flap track fairing for actuating the rear flap, air dam means, comprising:

a removable air dam which is structurally independent from the wing and positionable over the opening intersection of the wing rear cavity and the flap track fairing to prevent passage of air therebetween; and, mounting means for detachably securing said air dam to the wing;

wherein the aircraft wing includes power transmission means for powering the rear flap actuating means, said power transmission means being routed to the actuating means through the opening at the intersection of the wing rear cavity and flap track fairing; and, wherein said air dam means including a plate member and sealing means for forming an air-blocking seal between said plate member and said power transmission means.

7. Air dam means disposed within the interior of a trailing edge portion of a wing, said air dam means being positioned between higher and lower relative pressure regions of the wing to prevent the flow of air within the wing, comprising:

(a) the wing includes a fixed wing structure, a rear flap extending rearwardly from the fixed wing structure to together form a spanwise wing rear cavity, and a flap track fairing depending downwardly from the fixed wing structure, including the spanwise rear cavity of the rear flap, actuating means disposed in the flap track fairing for actuating the rear flap, wherein the flap track fairing is open at its intersection within the wing rear cavity;

(b) an air dam extending along the intersection of the wing rear cavity and the flap track fairing to prevent passage of air therebetween;

(c) means for removably mounting said air dam to the wing;

(d) wherein the fixed wing structure includes a rear spar defining the forward boundary of the wing rear cavity, said mounting means detachably secures the air dam to the rear spar to extend rearwardly therefrom to the rear flap;

(e) wherein the wing includes power transmission means for powering the rear flap actuating means, said power transmission means being routed to the actuating means through the flap track fairing opening; and, (f) wherein said air dam includes a plate member and sealing means for forming an air blocking seal between said plate member and said power transmission means.

8. In an aircraft wing having a fixed wing structure, a rear flap extending rearwardly from the fixed wing structure to define a spanwise wing rear cavity, a flap track fairing depending downwardly from the fixed wing structure including from the spanwise rear cavity portion thereof, with the flap track fairing being open at intersection with the wing rear cavity, actuating means disposed in the flap track fairing for actuating the rear flap, an air dam assembly comprising:

removable air dam means which is structurally independent from the wing and positionable over the opening at intersection of the wing ear cavity and the flap track fairing to prevent passage of air therebetween;

mounting means for detachably securing said air dam means to the wing; and sealing means extending along the periphery of the air dam means for nominally overlapping the margins of the opening between the rear wing cavity and the flap track fairing for forming an air blocking seal between said air dam means and the opening.

9. Air dam means disposed within the interior of a trailing edge portion of a wing of an aircraft, said wing having a fixed wing structure, a rear flap extending rearwardly from the fixed wing structure to define a spanwise wing rear cavity, a flap track fairing depending downwardly from a fixed wing structure including from the spanwise rear cavity portion thereof, with the flap track fairing being open at its intersection with the wing rear cavity, and actuating means disposed within the flap track fairing for actuating the rear flap, said air dam means comprising:

a removable air dam extending along the opening at the intersection of the wing rear cavity and the flap track fairing to prevent passage of air therebetween;

mounting means for detachably securing said air dam to the wing;

wherein said aircraft includes means for powering the rear flap actuating means, said powering means being routed to the actuating means through the opening at the intersection of the wing rear cavity and the flap track fairing; and, said air dam having portions defining an opening to accommodate the routing of said powering means to said actuating means.

10. The air dam means according to claim 9, further comprising sealing means for forming an air-blocking seal between said air dam and said powering means.

* * * * *

UNITED STATES PATENT AND TRADEMARK OFFICE
CERTIFICATE OF CORRECTION

PATENT NO. : 4,712,752

DATED : December 15, 1987

INVENTOR(S) : Paul F. Victor

It is certified that error appears in the above-identified patent and that said Letters Patent is hereby corrected as shown below:

Column 1, line 26, "air craft" should be -- aircraft --.

Column 3, line 52, "interset" should be -- intersect --.

Column 6, line 34, "typicaly" should be -- typically--.

Column 6, line 53, "asssociate" should be -- associated --.

Column 8, line 42, after "flap" (first occurrence), insert -- track --.

Column 9, line 31, "within" should be -- with --.

Column 10, line 12, "ear" should be -- rear --.

Signed and Sealed this

Thirteenth Day of December, 1988

Attest:

DONALD J. QUIGG

*Attesting Officer*  *Commissioner of Patents and Trademarks*